Patented Aug. 23, 1932

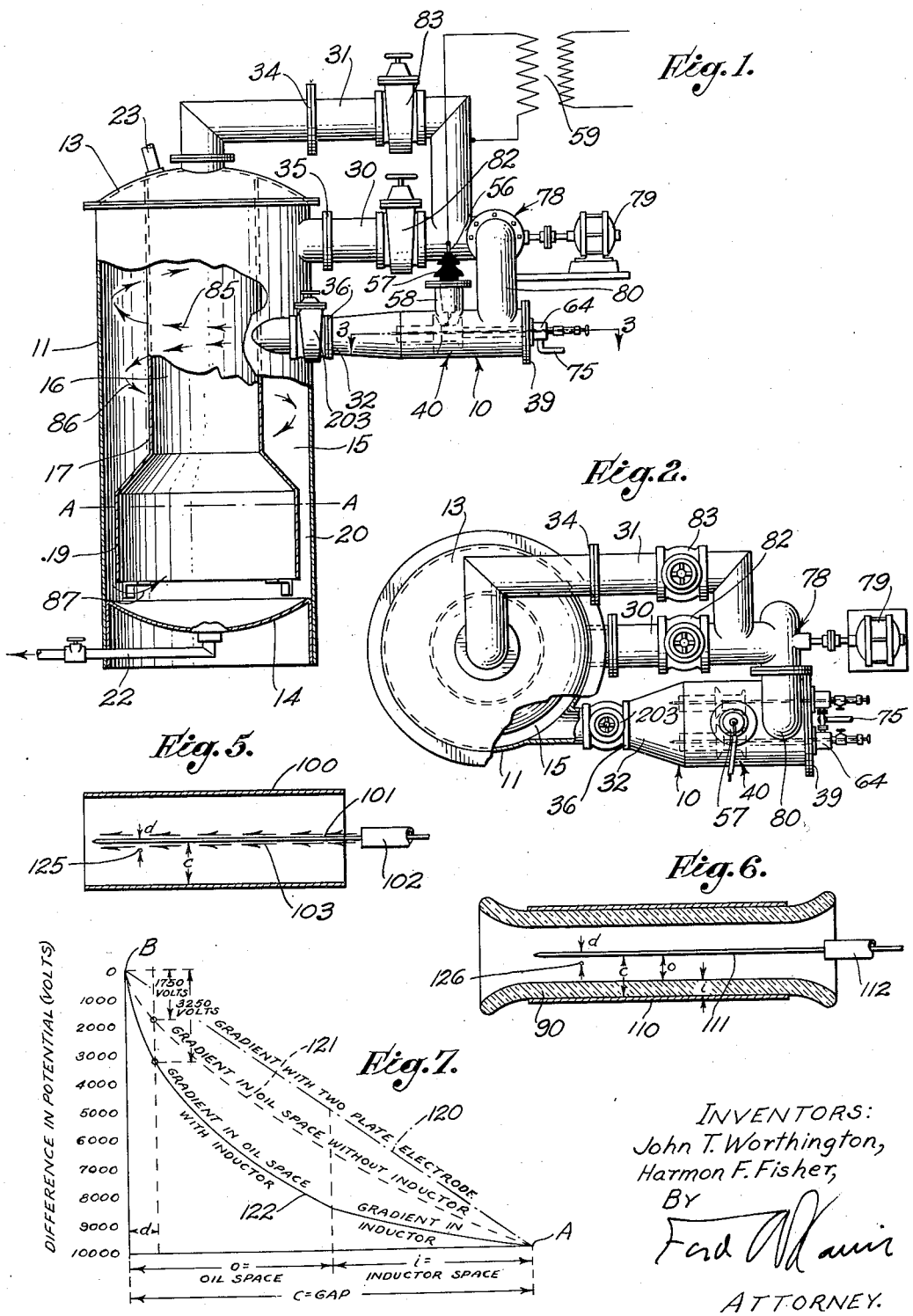

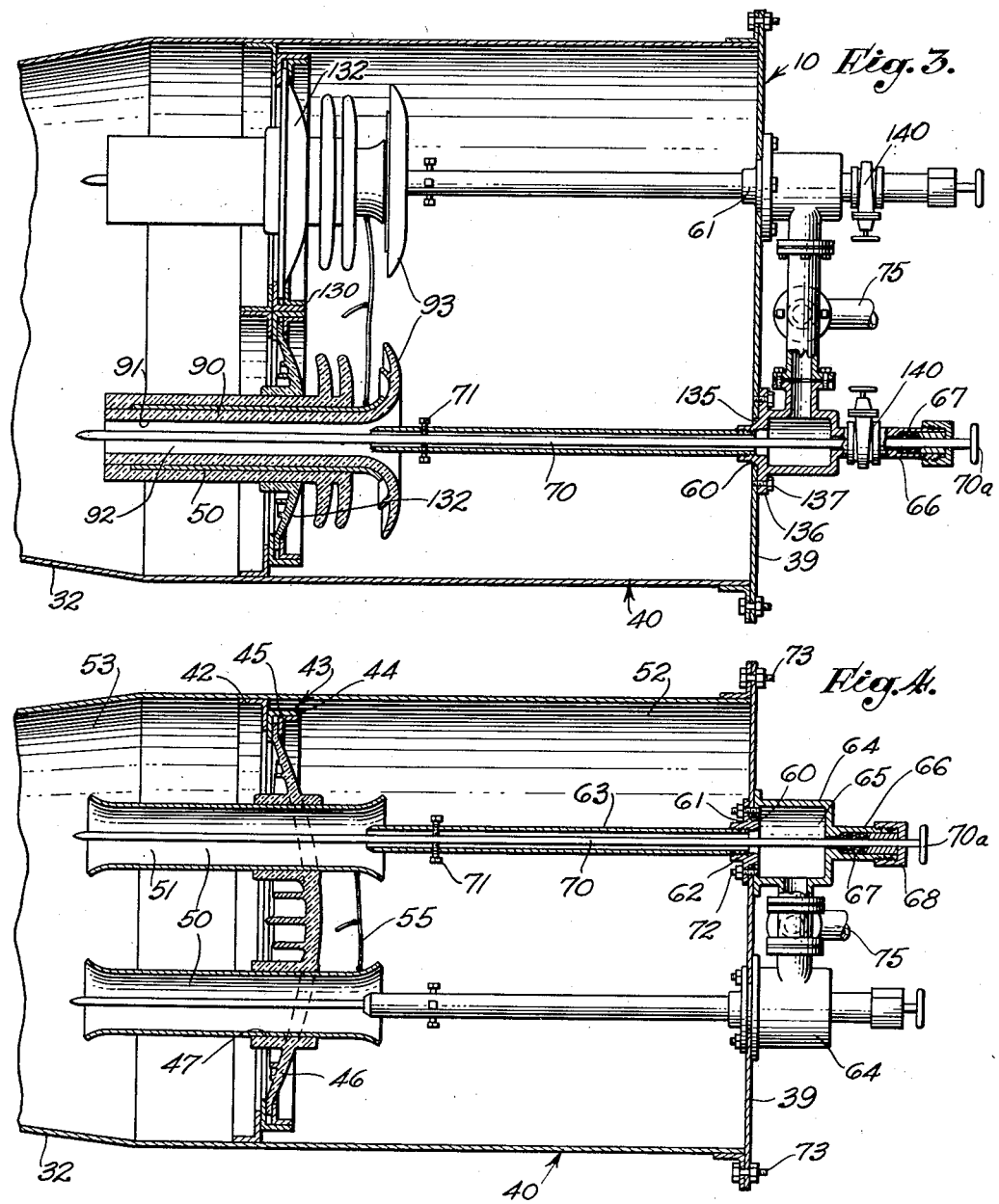

1,873,857

UNITED STATES PATENT OFFICE

JOHN T. WORTHINGTON AND HARMON F. FISHER, OF LONG BEACH, CALIFORNIA, ASSIGNORS TO PETROLEUM RECTIFYING COMPANY OF CALIFORNIA, OF LOS ANGELES, CALIFORNIA, A CORPORATION OF CALIFORNIA

PIPE-LINE TREATER

Application filed May 25, 1931. Serial No. 539,764.

Our invention relates to electric treaters, and more particularly to a novel form of treating apparatus incorporating a novel electrode structure.

One conventional method of resolving emulsions into their constituent phases consists in subjecting an emulsion to the action of a high intensity alternating current field, whereby the minute droplets forming the dispersed phase are agglomerated into masses of sufficient size to be conveniently separated from the continuous phase. In the conventional petroleum emulsion so prevalent in the petroleum industry, the dispersed phase is formed of water and is highly conducting, while the continuous phase is of oil having a relatively high dielectric strength. These water particles tend to line up when agglomerated and form low-resistance paths between the electrodes, thus destroying the effectiveness of the treatment. To prevent this action various complicated devices have been provided.

In an application, Serial No. 135,804, filed September 16, 1926, by Harmon F. Fisher, one of the co-inventors of the instant application, there is disclosed a form of treater in which excessive current flow is effectively prevented by suitable design of the electrodes. As therein disclosed, if one electrode is in the form of a sleeve and the other in the form of a relatively small rod extending axially through the sleeve, the voltage gradient of the electric field set up between these electrodes is non-uniform, and is highly concentrated immediately adjacent the central electrode. It has been found that by confining the emulsion to be treated to an area immediately around the small central electrode, no excessive current will flow, especially if a liquid dielectric is maintained in the outer or low intensity portion of the field. The present invention is an improvement on such a treater and in explaining the utility thereof, it is best to briefly point out certain factors which cover the rate and effectiveness of such treatment.

Extensive tests have proved that the effectiveness of the electric treatment is in large measure determined by the intensity of the electric field to which it is subjected. This effectiveness is evidenced not only in an increased rate at which the emulsion may be treated, but in the successful treatment of certain types of emulsions heretofore impractical or impossible of electric treatment without the aid of chemicals. It might appear that simply increasing the voltage between conventional electrodes to increase the gradient therebetween would give the desired results. Such, however, is not the case, for the water particles inevitably line up to form short-circuiting chains between the electrodes when extremely high potentials are applied unless external means are utilized for preventing this action. The utilization of the concentric electrodes with a fluid envelope of the emulsion flowing immediately around the central electrode solves, in large measure, certain of these problems of increasing the voltage gradient without short-circuiting. Even with such concentric electrodes, however, there are practical limits to the gradient which can be economically produced, and it is an important object of the present invention to provide an electrode structure wherein the voltage gradient adjacent one electrode is increased by positioning a material of high inductive capacity adjacent the other electrode.

We are aware that attempts have been made to coat one of the electrodes with a high-resistance material to prevent current flow exceeding desirable limits. Such, however, is not the sole function of the material utilized in this invention, for excessive currents between the concentric electrodes may be prevented by other means. A clear distinction should be drawn between such materials of high electrical resistance, and materials such as utilized in the instant invention which are of high inductive capacity. The differences in function between these materials will be stressed more in detail hereinafter.

It is another important object of the invention to provide an electrode structure in which one electrode is coated with a material of high inductive capacity, and, in addition, to force the emulsion to be treated through the electric field at a relatively high velocity, and in the form of a fluid envelope immediately around the other electrode.

These features we have incorporated in an electric treater of novel construction which, in itself, has many advantages over existing treaters. One of the problems arising from the use of concentric electrodes, the central of which is of small diameter, is the prevention or removal of scale which forms on such an electrode. In existing treaters these concentric electrodes are supported in a relatively large tank which is completely filled with the constituents of the emulsion. When scale forms on the electrodes, it is necessary to drain such a tank and steam it before an operator can have access to the electrode structures for cleaning purposes. In view of the fact that such tanks often retain 180 barrels or more of liquid, this operation of draining, cleaning, and refilling usually takes the greater part of a day to complete.

It is an object of the present invention to provide a treater in which the electrodes may be removed without draining the tank, thus making it possible to clean the electrodes in a small fraction of the time previously necessary and eliminating the step of steaming the treater.

Another important object of the invention is to provide a nozzle structure for a treater which may be removed as a unit with one of the electrodes.

Still other objects of the invention lie in the novel construction of this nozzle structure, and especially in the centering means provided thereon both for centering the nozzle structure with regard to the container and for centering the electrode extending from the nozzle.

A further object of the invention is to provide a novel manner of forcing a liquid dielectric through the treating space by supplying the dielectric under pressure to a manifold chamber communicating with this treating space.

Our electric treating apparatus is not submerged in a body of liquid retained in the tank, but instead is positioned outside of a tank so as to be easily detachable therefrom, and it is an object of this invention to provide a treating device which may be detached from a tank or other supply means as a unit, thus permitting easy removal of the treating device.

Still other objects of the invention lie in a novel tank construction for use with such a treating device wherein a dielectric material may be withdrawn therefrom and circulated through the electric field along with the emulsion to be treated.

In addition, the invention comprehends numerous other objects some of which will be apparent from the detailed disclosure hereinafter made for illustrative purposes.

Referring to the drawings,—

Fig. 1 is a side view, partially broken away, illustrating a tank and electric treating apparatus of our invention.

Fig. 2 is a top view of Fig. 1, partially broken away to illustrate the tangential inlet.

Fig. 3 is a sectional view taken on the line 3—3 of Fig. 1.

Fig. 4 is a view similar to Fig. 3 showing an alternative form of electrode construction.

Figs. 5 and 6 are diagrammatic representations of electrode structures with and without a coating of material of high specific inductance.

Fig. 7 is a curve illustrating the gradients obtained by the use of the electrode structures shown in Figs. 5 and 6.

Referring particularly to Fig. 1, the treating device of our invention is indicated by the numeral 10 and is attached to a tank 11 which is usually in the form of a settling tank including upper and lower heads 13 and 14. The interior of this tank is divided into a circulating chamber 15 and a dry oil chamber 16 by baffle 17 extending downward from the upper head 13 and terminating a distance above the lower head 14 whereby the chambers 15 and 16 are in communication at their lower ends. The bottom of a baffle 17 is flared to form a skirt, the outer wall 19 of which is relatively close to the wall of the tank 11 so as to form a narrow throat 20 through which the treated emulsion is forced in a manner to be subsequently described. This treated emulsion is usually in the form of relatively large water globules loosely suspended in oil, and it has been found that when the treated emulsion is forced downward through the throat 20 a very efficient washing action takes place if the water level is maintained as indicated by the line A—A. The effectiveness of this washing action is increased by the increased velocity in the throat 20, and the water droplets associate themselves with the main body of water below the level A—A, the dry oil rising in the dry oil chamber 16. The level A—A may be controlled by varying the relative amounts of water and oil withdrawn respectively through pipes 22 and 23 communicating in turn with the lower portion of the tank 11 and with the upper portion of the dry oil chamber 16.

The treating device 10 of our invention is a complete unit in itself and is detachably secured to the exterior of the tank 11. In one embodiment of the invention, this treating device is secured to the tank by primary and secondary intake pipes 30 and 31 which respectively communicate with the upper portion of the circulating chamber 15 and the upper portion of the dry oil chamber 16 and by a discharge pipe 32 communicating tangentially with the circulating chamber 15 at a point below the point of communication between the primary intake pipe 30 and the circulating chamber. These pipes 30, 31, and 32 are respectively provided with pairs of flanges 34, 35, and 36, the flanges of each pair being connected together by suitable means such as by passing bolts therethrough in the conventional manner. Thus by removing these bolts, it is possible to detach the entire treating device 10 from the settling tank 11.

The outer portion of the discharge pipe 32 cooperates with an end wall 39 in forming an enclosing structure 40. That form of the invention shown in Fig. 4 includes a flange 42 secured to the inner wall of the enclosing structure 40, and detachably secured to this flange is an insulator support 43 comprising two telescoping members 44 and 45 which retain the outer edge of an insulator 46 therebetween. This insulator is of special construction, and, in the form shown in Fig. 4, provides a pair of openings 47, these openings being horizontally disposed relative to each other. Disposed in each of these openings is an outer or sleeve electrode 50 providing a throat 51 communicating with a dielectric storage or manifold chamber 52, defined by that portion of the enclosing structure 40 to the right of the insulator 46 and with a discharge chamber 53 formed in the flared portion of the discharge pipe 32. The throats 51 of the two sleeve electrodes 50 thus form the only means of communication between the chambers 52 and 53.

The sleeve electrodes 50 are connected together by a conductor 55 which is in turn connected to a rod 56 extending through an insulator 57 positioned in a dome 58 forming a part of the enclosing structure 40, as shown in Fig. 1. The rod 56 is in turn connected to one terminal of the secondary of a transformer 59, the other terminal of this secondary being grounded to the treating device 10.

Two openings 60 are formed in the end wall 39 in alignment with the axes of the sleeve electrodes 50. A pair of spacers 61 is provided, each spacer having a head portion which snugly fits one of the openings 60, and provides a boss 62 in which a fluid-conducting sleeve 63 is threaded, this sleeve extending concentric with the axis of its sleeve electrode 50. Also positioned adjacent each opening 60 is a head 64 providing a chamber 65 and a neck 66. This neck in turn provides a packing chamber in which a packing 67 is positioned, this packing being compressed by a gland 68 in the usual manner, so as to form a fluid-tight connection with a rod electrode 70 providing a handle 70a for withdrawing same through the packing 67. This rod electrode extends through the chamber 65, through the fluid-conducting sleeve 63 and axially into the sleeve electrode 50, the electrodes 50 and 70 cooperating in defining a treating space in which an electric field is established. The rod electrode 70 is held in centered relationship relative to the sleeve 63 by a centering means 71 comprising three or more bolts threaded through the sleeve and slidably engaging the periphery of the rod electrode. The sleeve 63 is, in turn, held in proper position by engagement with the spacer 61, this spacer and the head 64 thereadjacent being clamped together as by bolts 72. The head on this spacer cooperates with the opening 60 in defining a centering means for the sleeve 63.

It is desirable that the end wall 39 in this form of the invention be detachably secured to the remainder of the enclosing structure 40, this being accomplished by bolts 73, thus permitting the electrode structures comprising the head 64, sleeve 63, and rod 70 to be removed from the enclosing structure as a unit while still secured to the end wall 39. On the other hand, it is possible to withdraw the rod electrode 70 without detaching this end wall, thereby permitting easy cleaning of this rod electrode when scale or other foreign matter accumulates thereon. In view of the centering means provided, there is no danger of this rod electrode coming into contact with the sleeve electrode 50 when being again reinserted, so that this cleaning step may be accomplished without de-energizing the treating device.

The heads 64 are interconnected, and communicate with an emulsion supply pipe 75, shown in Fig. 1. Emulsion is supplied to this pipe under pressure and flows into the respective heads 64, being discharged therefrom through the annular space between the rod electrode 70 and the sleeve 63. This fluid thus forms an envelope immediately around the rod electrode 70, and is discharged with such velocity that it remains around the electrode and substantially in contact therewith throughout the time that it passes through the electric field formed between the electrodes 50 and 70. No material separation of the phases of the emulsion takes place in this field, the action being an agglomerating one wherein the water particles are agglomerated into larger droplets.

To assist this flow of emulsion around the rod electrode 70, we provide a pumping means 78 suitably driven as by a motor 79, the intake of this pumping means being connected both to the primary and secondary intake pipes 30 and 31, as shown in Figs. 1 and 2. The discharge of this pumping means is connected to a pipe 80 which communicates with the dielectric storage chamber 52 and forces liquid withdrawn from the tank 11 thereinto, thereby increasing the pressure in this tank over the pressure in the discharge chamber 53, and thereby forcing a tream of this recirculated liquid through the outer portion of the treating space in contact with the inner surface of the sleeve electrode 50. This liquid which is circulated from the tank 11 is preferably of higher dielectric strength than the emulsion to be treated.

The primary and secondary intake pipes 30 and 31 are provided with valves 82 and 83, so that if the former valve is alone opened, the liquid forced into the dielectric storage chamber 52 will be dry oil withdrawn from the upper end of the dry oil chamber 16. If, on the other hand, the valve 82 is alone opened, the fluid circulated will have a higher water content. By this system of valves, it is possible to recirculate a liquid of any desired dielectric strength.

The treated emulsion, together with the recirculated liquid, is introduced tangentially into the circulating chamber 15, the lighter oil tending to rise as it flows therearound, as indicated by the arrows 85 of Fig. 1, and the heavier constituent thereof moving downward in a helical path, as indicated by the arrows 86. This heavier constituent, however, carries with it a major portion of the dry oil which is still loosely intermixed with the water. The water globules attach themselves to the body of water indicated below the level A—A, and the dry oil particles are washed thereby, moving downward around the lower end of the baffle 17 and upward into the dry oil chamber 16, as indicated by the arrow 87 of Fig. 1.

The electrode structure shown in Fig. 4 is entirely successful with certain emulsions, but when treating other emulsions it has been found desirable to use even higher voltage gradients than those economically attainable by the use of these electrodes. Thus, in Fig. 3, we have shown the sleeve electrodes 50 as being provided with a lining forming an inductor 90 which occupies the outer portion of the treating space, and which provides an inner surface 91 in spaced relationship with the rod 70 so as to provide an oil space 92 therebetween. That end of the inductor 90 adjacent the sleeve 63 is flared to form a bell 93 extending outward beyond the outer lip of the sleeve electrode.

The utility of this inductor 90 as applied to the instant invention and its novel cooperation with an electrode structure such as that shown, may best be illustrated by reference to Figs. 5, 6, and 7. In Fig. 5, we have diagrammatically shown a sleeve electrode 100 with a central electrode 101 extending axially thereinto, and a nozzle 102 which forms a thin fluid envelope of emulsion moving along and in contact with the central electrode 101, as indicated by arrows 103. In Fig. 6, we have shown an identical sleeve electrode 110, an identical central electrode 111, and an identical nozzle 112. In addition, the sleeve electrode 110 has been shown equipped with an inductor such as the inductor 90. In both electrode structures the distance between the sleeve electrode and the rod electrode is represented by the letter $c$. Similarly, the distance across the inductor is indicated by the letter $i$, and the distance across the oil space by the letter $o$.

Referring now to Fig. 7, we have therein shown a typical series of gradient curves, such as can be obtained by the use of such electrode structures. The ordinates on this graph represent potential, and the graph has been plotted to represent a potential of 10,000 volts impressed between the electrodes. The abscissa of this graph represents distance, and the point A represents a point on the surface of the sleeve electrode which is directly opposite a point B on the surface of the central electrode. The distance between the points A and B along the abscissa scale thus represents the distance $c$ across the gap between the electrodes, and the distances across the oil space and the inductor space being respectively indicated by the letters $o$ and $i$.

If a potential of 10,000 volts were impressed across a pair of plate electrodes spaced across a distance $c$, the gradient of the electric field would be uniform. If, for instance, the distance $c$ equals 3 inches, this gradient would be equal to 3,333 volts per inch. Such a gradient is indicated on Fig. 7 by the dot-dash line 120. If, however, the same potential is impressed across concentric electrodes, such as shown in Fig. 5, the field at the surface of the central electrode becomes highly concentrated due to the small surface area of this central electrode. A typical curve representing the gradient in such an electrode system is shown by the dotted line 121 of Fig. 7. The slope of this curve at any point represents the voltage gradient at a corresponding point in the electric field, and it will thus be apparent that immediately adjacent the surface of the central electrode the gradient is extremely high and may be in the neighborhood of 10,000 volts per inch. In the outer portion of the treating space the gradient is, however, very low, as indicated by the slope of that portion of the curve 121 approaching the point A.

It will be at once apparent that if the entire treating space between the plate electrodes, similarly spaced were to be filled with an emulsion having a break-down voltage of 3,000 volts per inch, for instance, these electrodes would be immediately short-circuited in view of the fact that the gradient in the field is in excess of the break-down value and disregarding any instantaneous treating action taking place on the emulsion. If, however, the electric field between the electrodes of Fig. 5 is completely filled with the same emulsion, it will be found that short-circuiting of the electrodes will not occur, for the gradient in the outer portion of the field is far below the break-down value of the emulsion. On the other hand, it will be found that that portion of the emulsion immediately around the central electrode 101 is effectively treated, and that no break-down thereof takes place even though gradients as high as 10,000 volts per inch are impressed thereon immediately adjacent the surface of the central electrode. It thus becomes at once apparent that such an electrode system permits the use of gradients heretofore impossible of attainment, and the results obtained by the use of such an electrode system have been indeed gratifying, it having been found possible to treat emulsions which were otherwise impossible to treat by electrical methods, as disclosed in the co-pending application, Serial 135,804, supra.

It might appear, then, voltage gradients of still greater magnitude could be obtained by (1) increasing the voltage between the electrodes, and (2) decreasing the size of the central electrode. It has been found, however, that economic conditions control both of these factors. For instance, increased voltage requires insulating apparatus sometimes ten-fold as expensive as necessary with the lower voltage, and the rod electrode 101 must be made of such size that there will be no tendency for it to bend. It thus appears that from an economic standpoint there is a practical limit to the gradient obtainable by the use of an electrode structure such as shown in Fig. 5. It is in the solution of this problem that the inductor 90 plays a very material part, for it has been found that gradients which are even higher than those economically obtainable with the electrode structure shown in Fig. 5 are very desirable, and that such increased gradients permit a more rapid treatment, and also effective treatment of otherwise untreatable emulsions.

It is essential to this invention that if an inductor 90 be used, this inductor be formed of a material having a high specific inductive capacity. It has been found that if an inductor of such material is used, the voltage gradient adjacent the central electrode may be increased several hundred per cent with the same potential difference between the electrodes. The gradient in the inductor will, however, be relatively low. A typical gradient curve of such an electrode structure is indicated by the numeral 122 of Fig. 7, the lower or flat portion of this curve representing the gradient in the inductor, while the upper or steep portion of the curve represents the gradient in the oil space. As an example of the difference in gradient adjacent the central electrode when electrode systems of Figs. 5 and 6 are utilized, assume that a water droplet 125 is positioned a distance $d$ from the surface of the central electrode 101, and assume that another droplet 126 is spaced the same distance $d$ from the central electrode 111. These droplets are indicated in Figs. 5 and 6, and the positions thereof are also indicated in Fig. 7. With the typical curves illustrated in Fig. 7 measurement will show that the difference in potential between the particle 125 and the rod electrode 101 will be 1,750 volts, as indicated in Fig. 7, while the difference in potential between the particle 126 and the central electrode 111 will be 3,250 volts. Measurement will also show that the field intensity to which the particle 125 is subjected (as measured by the slope of the curve 121 at this position in the field) is approximately 6,100 volts per inch, while the field intensity adjacent the particle 126 is approximately 10,350 volts per inch. The agglomerating force acting upon this particle has been found to be the product of the field intensity and the difference in potential. Multiplying these two factors setting up a force on the particles 125 and 126 respectively, it will be found that the agglomerating force acting on the particle 126 is substantially 318% greater than that acting upon the particle 125. This illustration is a conservative one, and if we consider particles closer to the surface of the electrodes than are the particles 125 and 126, the increased effectiveness of treatment is even more startling in view of the increased steepness of the curves 121 and 122 as they approach the point B.

The material of which the inductor 90 is formed directly controls the production of such increased gradients. If, for instance, this inductor were made of a material having a specific inductive capacity equal to the specific inductive capacity of the emulsion being treated, the curve 122 would lie along the curve 121 and no increased gradient would be obtained. Other materials such as boron or Jena glass have a relatively high inductive capacity; namely, from 7.8 to 8.5. Other types of glass are, however, quite unsuited, having specific inductive capacities as low as 5.5 when in a pure state and often lower when in a relatively impure state. Carrara marble is another material having a desirable specific inductive capacity of approximately 8.3, and the inductor may be formed of this material if suitably treated to prevent it from absorbing moisture. Quartz or certain cements known to the art also have a relatively high specific inductive capacity; namely, from 4.7 to 5.0.

It should be understood that the inductor 90 is not positioned in the treating space for the purpose of preventing excessive current flow, though, of course, if the inductor incidentally has a high resistance, this will further tend to prevent excessive current flow. It is not necessary, however, that this inductor have a high resistance, for if this inductor were only used as a high resistance, the same purpose of preventing excessive current flow could be obtained almost equally effectively by placing a high resistance of suitable value elsewhere in the secondary circuit of the transformer 59. It is, however, true that many materials having a high specific inductive capacity are also good insulators, although the relationship is not a strict one. For instance, distilled water having a specific inductive capacity of 81 is a relatively poor conductor, but if a small amount of electrolyte is added thereto, the conductivity increases very much faster than the specific inductive capacity decreases. In other words, it may become conductive and still retain considerable of its original specific inductive capacity. As another example, 46% hydrogen peroxide in water has a still higher specific inductive capacity (namely, 84.7) and is a comparatively good conductor. It should thus be evident that the property of resistivity or conductivity is not closely associated with the specific inductive capacity of a substance, and that the insertion of a body of high resistance material in the treating space does not necessarily accomplish the same results as when an inductor of high specific inductive capacity is utilized.

Likewise, it is often true that the dielectric strength, or ability to withstand electrical break-down, is relatively high in materials of high specific inductive capacity. This, however, is not necessarily so, as evidenced by the fact that air having a specific inductive capacity of 1 has a dielectric strength of 40 to 90 kilovolts per cm., while high-voltage porcelain with a specific inductive capacity of 4.4 to 6.8 has a dielectric strength of 90 to 110 kilovolts per cm. There is no uniform or constituent relationship between the dielectric strength of a body and the specific inductive capacity, so that a body of high dielectric strength positioned in the treating space would not necessarily have the same effect as an inductor of high specific inductive capacity.

The combination of concentric electrodes with an inductor positioned therebetween is especially valuable when a stream of the emulsion is forced therethrough at a relatively high velocity. The increased gradient permits a corresponding increase in velocity, and a corresponding increase in capacity of the treater, but in addition there appears to be a further desirable action when the emulsion is moved through the field at such a rate that no separation takes place therein. This additional desirable action is evidently independent of increased capacity, and may be due to a change in the specific inductive capacity of the emulsion during treatment thereof. In other words, the specific inductive capacity of the material immediately adjacent the central electrode has an effect upon the concentration of the field thereadjacent, for, obviously, if this specific inductive capacity was as high as that of the inductor 90, there would be less concentration of the field adjacent this central electrode than if the specific inductive capacity was very low, as it usually is in the event of the oil-water emulsion. It thus appears that the combination of concentric electrodes and an inductor positioned in the treating space finds particular utility when the fluid is moved through the field at a high velocity.

Various methods of operation of the apparatus are possible. For instance, it is sometimes possible to completely close valves 82 and 83, the dielectric storage chamber 52 being filled with a body of emulsion or dielectric liquid. In this event, it is possible to fill the entire oil space with emulsion, sufficient pressure being supplied to the emulsion flowing through the inlet pipe 75 to maintain a flow through the field. This method of operation is possible with the apparatus illustrated in Fig. 4, as well as that illustrated in Fig. 3, and it is possible to prevent short-circuiting by suitably controlling the velocity or by utilizing an emulsion having a break-down value higher than the intensity of the field adjacent the outer electrode, as previously pointed out. When such a method of operation is used with the apparatus shown in Fig. 3 any incidental insulating value of the inductor 90 will tend to be an additional factor of safety in preventing short-circuiting.

On the other hand, the pumping means 78 may be operated so as to increase the pressure in the dielectric chamber 52 to such an extent that a relatively fast moving stream of electric dielectric flows through the treating spaces. In this event, the pressure on the emulsion supply pipe 75 can be cut down, for the circulating fluid moving through the outer portion of the treating space will carry the fluid envelope of emulsion therethrough around the central electrode 70. In other instances it is possible to increase the pressure on the incoming emulsion to such an extent that the pumping means 78 may be completely dispensed with and the fluid circulated from the tank into the dielectric storage chamber 56 and through the treating space, due to the injector action of the stream of incoming emulsion.

It is often desirable to extend the inductor 90 so that it covers the outside of the sleeve electrode as well as the inside. Such a construction is shown in Fig. 3, in which the outer portion of the inductor is formed in a separate piece from that portion of the inductor lying in the treating space, such a construction being easier to fabricate. Similarly, in Fig. 3, we have shown the insulator 46 as being replaced by two individual insulators held in fluid-tight relationship in respective sockets of a wall 130 defining one end of the dielectric storage chamber 56. These insulators are indicated by the numeral 132 and may be of standard construction.

Similarly, in Fig. 3 we have illustrated a slightly different form of head for supplying the fluid to the interior of the sleeve 63. In this construction, the head and spacer 61 are formed in a unit, this unit providing a projection 135 which snugly fits in the opening 60 of the end wall previously described and acting as a centering means. This unitary type of head includes a flange 136 which is secured to the end wall 39 as by cap screws 137. By thus loosening these cap screws and by disconnecting the head from the intake pipe 75, it is possible to quickly withdraw the entire electrode structure including the rod 70 and the sleeve 63. The form of the invention shown in Fig. 3 also provides a valve 140 closing the passage formed through the neck 66 so that the rod 70 may be withdrawn until the point thereof lies to the right of the valve 140, after which the valve is closed prior to completely withdrawing the rod electrode from the packing 67. This construction makes it possible to clean the rod electrodes without draining any of the fluid from the tank or from the dielectric storage chamber 52.

It is sometimes desirable to be able to replace the insulator 57, the inductor 90, or the sleeve electrode 110. This may be done without draining the tank if a valve 203 is positioned in the discharge pipe 32, this valve (along with the valves 82 and 83) being closed before the treating elements are disconnected. This construction permits the treating elements to be absolutely independent of the tank itself.

The advantages of such a treater are manifold. In the first place, the treating device may be attached to any convenient tank and requires no special foundation. Further, it is relatively cheap to construct and extremely easy to replace as a unit, thus allowing any repair work necessary to be done in the shop rather than in the field, and effecting a large saving in time. In the second place, it is possible to acquire access to the parts of the treater for the purpose of inspection or renewal without draining the treater. Further, it is possible, due to the novel construction, to remove only that portion of the treater which is in need of inspection or repair without disturbing the other portions thereof. Thus, the rod electrodes may be individually removed, or the electrode structures may be individually inspected. On the other hand, both electrode structures may be withdrawn as a unit by removing the bolt 73 or the complete treating unit may be removed by detaching the pairs of flanges 34, 35, and 36.

We claim as our invention:

1. In an electric treater, the combination of: a sleeve electrode; a central electrode insulated from said sleeve electrode and extending axially thereinto, whereby an electric field set up between said electrodes will be concentrated at the surface of said central electrode; an inductor of high specific inductive capacity positioned in said electric field to further increase the intensity of the field adjacent said central electrode; and means for moving a stream of the fluid to be treated through only that portion of said field which is of higher intensity, said stream of fluid being in the form of a fluid envelope around said central electrode and flowing between said central electrode and said inductor.

2. In an electric treater, the combination of: a sleeve electrode communicating with a body of liquid of higher dielectric strength than the fluid to be treated; a central electrode insulated from said sleeve electrode and extending axially thereinto, whereby an electric field set up between said electrodes will be concentrated at the surface of said central electrode; an inductor of high specific inductive capacity positioned in said electric field to further increase the intensity of the field adjacent said central electrode; and means for moving concentric envelopes of said liquid and said fluid to be treated through said electric field, said envelope of fluid to be treated moving immediately adjacent said central electrode.

3. In an electric treater, comprising: walls forming a dielectric manifold chamber and a discharge chamber thereadjacent; a primary electrode providing a throat through which said manifold chamber and said discharge chamber communicate; pump means for supplying a dielectric to said manifold chamber and raising the pressure therein above the pressure in said discharge chamber whereby a stream of said dielectric moves through said throat; a secondary electrode extending into said throat whereby an electric field may be set up between said electrodes; and means for introducing a stream of emulsion to be treated into the space between said electrodes.

4. An electric treating apparatus for treating an emulsion, comprising: a settling tank containing a liquid which is drier toward the top of said tank than toward the bottom; walls defining a dielectric storage chamber and a discharge chamber, said discharge chamber communicating with said tank; a primary electrode providing a throat through which said dielectric storage chamber and said discharge chamber communicate; a secondary electrode insulated from said primary electrode and extending into said throat to define a treating space in which an electric field is established when said electrodes are energized; means for delivering the emulsion to be treated to said treating space; and a pumping means intaking from the upper portion of said tank and discharging into said dielectric storage chamber in a manner to build up a pressure therein greater than in said discharge chamber whereby dielectric flows through said treating space.

5. In a treater, the combination of: a settling tank; a treating device detachably connected to the exterior of said tank so as to be replaceable as a unit, said treating device comprising a pair of electrodes for setting up an electric field in a treating space defined thereby, means for introducing the fluid to be treated into said treating space, and pipe means for conducting the treated fluid from said treating space into said tank; and a recycling means for recirculating through said treating space a portion of the fluid in said settling tank.

6. A combination as defined in claim 5 in which said pipe means forms the means whereby said treating device is detachably connected to said tank.

7. In an electric treater, the combination of: a settling tank in which two phases of an emulsion may settle; an electric treating device attached to the exterior of said tank, said device including an intake pipe communicating with the lighter of said constituents in the upper end of said tank, a discharge pipe communicating with said tank at a level below the point of communication of said intake pipe, and a pair of electrodes defining a treating space communicating with both said intake and discharge pipes; a pumping means for drawing said lighter constituent through said intake pipe and said treating space and discharging it into said settling tank through said discharge pipe; and means for introducing the emulsion to be treated into said treating space.

8. A combination as defined in claim 7 including means for quickly detaching both of said pipes from said tank to allow replacement of said treating device as a unit.

9. A combination as defined in claim 7 in which said intake pipe comprises a primary intake means, and including a secondary intake means communicating between said treating space and a section of said tank spaced from said primary intake means, whereby a liquid is drawn into said treating space which is of different density from that drawn through said primary intake means.

10. In an electric treater, the combination of: a settling tank providing a circulating chamber and a dry oil chamber in communication with each other at their lower ends, an electric treating device attached to the exterior of said tank and providing a pair of electrodes defining a treating space, a discharge pipe communicating with said circulation chamber and an intake pipe communicating with said dry oil chamber; means for circulating dry oil from said dry oil chamber through said treating space; and means for introducing the fluid to be treated into said treating space so as to be carried along with said dry oil.

11. A combination as defined in claim 10 including another intake pipe communicating between said treating space and said circulating chamber, and including means for regulating the relative flows through said intake pipes.

12. In an electric treater, the combination of: a settling tank including upper and lower heads; a baffle in said settling tank and extending downward from said upper head, said baffle cooperating with said tank to define a circulating chamber and a dry oil chamber in communication at their lower ends; a pair of electrodes outside said tank and defining a treating space; means for introducing the fluid to be treated into said treating space; and means for conducting the treated fluid from said treating space into said circulating chamber.

13. In an electric treater, the combination of: an enclosing structure; a live electrode in said enclosing structure and insulated therefrom; a nozzle assembly detachably connected to said enclosing structure and providing a fluid-conducting sleeve extending toward said live electrode and providing a rod electrode extending through said sleeve and adjacent said live electrode; and means communicating with said nozzle assembly for supplying the fluid to be treated into the space between said rod electrode and said sleeve.

14. A combination as defined in claim 13 including a centering means between said sleeve and said rod electrode, and a centering means between said enclosing structure and said nozzle assembly.

15. A combination as defined in claim 13 including means for removing said rod electrode from said nozzle assembly without detaching said nozzle assembly from said enclosing structure.

16. In an electric treater, the combination of: an enclosing structure; a sleeve electrode in said enclosing structure; a rod electrode removably extending through a wall of said enclosing structure and extending centrally into said sleeve electrode; packing means around said rod to permit withdrawal thereof; and a valve means between said packing means and said wall of said enclosing structure, said valve means being closed after said rod electrode has moved therethrough but before said rod electrode is withdrawn from said packing means.

17. In an electric treater, the combination of: an enclosing structure; a sleeve electrode in said enclosing structure; a rod electrode removably extending through a wall of said enclosing structure and extending centrally into said sleeve electrode; a sleeve around said rod electrode and extending inward from said wall and toward said sleeve electrode; and centering means associated with said sleeve for guiding said rod electrode centrally into said sleeve electrode.

In testimony whereof, we have hereunto set our hands at Long Beach, California, this 9th day of May 1931.

JOHN T. WORTHINGTON.
HARMON F. FISHER.